(12) United States Patent
Li (10) Patent No.: US 10,209,797 B2
(45) Date of Patent: Feb. 19, 2019

(54) LARGE-SIZE TOUCH APPARATUS HAVING DEPTH CAMERA DEVICE

(71) Applicant: BOE TECHNOLOGY GROUP CO., LTD., Beijing (CN)

(72) Inventor: Yingjie Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 194 days.

(21) Appl. No.: 15/211,568

(22) Filed: Jul. 15, 2016

(65) Prior Publication Data

US 2017/0024044 A1 Jan. 26, 2017

(30) Foreign Application Priority Data

Jul. 23, 2015 (CN) .......................... 2015 1 0437036

(51) Int. Cl.
*G06F 3/041* (2006.01)
*G06F 3/042* (2006.01)

(52) U.S. Cl.
CPC .......... *G06F 3/0412* (2013.01); *G06F 3/0425* (2013.01)

(58) Field of Classification Search
CPC .... G06F 3/041–3/04897; G06F 3/0412; G06F 3/0425
See application file for complete search history.

(56) References Cited

U.S. PATENT DOCUMENTS

| 2003/0169233 | A1* | 9/2003 | Hansen | G06F 3/0386 345/158 |
| 2008/0018595 | A1* | 1/2008 | Hildreth | G06F 3/011 345/156 |
| 2008/0239081 | A1* | 10/2008 | Helbing | G06F 3/0325 348/169 |
| 2010/0103330 | A1* | 4/2010 | Morrison | G06F 3/0412 348/744 |

(Continued)

FOREIGN PATENT DOCUMENTS

| CN | 102436301 A | 5/2012 |
| CN | 103154880 A | 6/2013 |

(Continued)

OTHER PUBLICATIONS

Second Chinese Office Action regarding Application No. 201510437036.0 dated Nov. 27, 2017. English translation provided by http://globaldossier.uspto.gov.

(Continued)

*Primary Examiner* — Temesghen Ghebretinsae
*Assistant Examiner* — Ivelisse Martinez Quiles
(74) *Attorney, Agent, or Firm* — Harness, Dickey & Pierce, P.L.C.

(57) ABSTRACT

Disclosed are a touch apparatus and an operating method of the touch apparatus. The touch apparatus includes: a depth camera device, a display screen disposed within a viewing range of the depth camera device, and a controller connected to the display screen and the depth camera device. The depth camera device is adapted to capture a depth image within the (Continued)

viewing range and send the depth image to the controller. The controller is adapted to receive the depth image, calculate based on the depth image and identify a current touch operation, and output an operation interface corresponding to the current touch operation to the display screen.

6 Claims, 4 Drawing Sheets

(56) References Cited

U.S. PATENT DOCUMENTS

| | | | | |
|---|---|---|---|---|
| 2012/0320198 | A1* | 12/2012 | Yasutake | G06F 3/005 348/143 |
| 2013/0121601 | A1* | 5/2013 | Yu | G06T 7/00 382/224 |
| 2013/0215027 | A1* | 8/2013 | Van Lydegraf | G06F 3/017 345/158 |
| 2014/0022198 | A1* | 1/2014 | Tanaka | G06F 3/0418 345/173 |
| 2014/0240293 | A1* | 8/2014 | McCaughan | G06F 3/0304 345/175 |
| 2014/0313136 | A1* | 10/2014 | Kratz | G06F 3/0425 345/173 |
| 2015/0185857 | A1* | 7/2015 | Jung | G06F 3/0304 345/156 |
| 2016/0334938 | A1* | 11/2016 | Kang | G03B 21/10 |
| 2017/0160869 | A1* | 6/2017 | Tang | G06F 3/0418 |

FOREIGN PATENT DOCUMENTS

| | | |
|---|---|---|
| CN | 103207709 A | 7/2013 |
| CN | 103295016 A | 9/2013 |
| CN | 103295476 A | 9/2013 |
| CN | 103956128 A | 7/2014 |
| CN | 204066070 U | 12/2014 |
| CN | 104536575 A | 4/2015 |
| CN | 104793784 A | 7/2015 |

OTHER PUBLICATIONS

First Office Action regarding Chinese Application No. 201510437036.0, dated Jul. 21, 2017. Translation provided by Dragon Intellectual Property Law Firm.

* cited by examiner

LARGE-SIZE TOUCH APPARATUS HAVING DEPTH CAMERA DEVICE

CROSS-REFERENCE TO RELATED APPLICATION

The present application claims a priority to Chinese Patent Application No. 201510437036.0 filed on Jul. 23, 2015, the disclosure of which is incorporated in its entirety by reference herein.

TECHNICAL FIELD

The present disclosure relates to the field of touch technology, and in particular, to a touch apparatus and an operating method of the touch apparatus.

BACKGROUND

An advisement player is a new generation intelligent apparatus, a complete advertisement broadcast-control system is constitute of a terminal software control, a network information transmission and a multi-media terminal display, an advertising campaign can be performed through multi-media materials such as pictures, characters, videos, small plug-ins.

Currently, the advisement player is of single function, which can only directly present a preset advertisement content to users approaching the advisement player, and the users cannot obtain detail information about products presented on the advisement player and cannot interact with the advisement player. The advertising effect is poor, purchase appetency of customers cannot be caught, thus good advertising effect cannot be achieved. In order that the users can interact with the advisement player, a touch screen can be disposed on the advisement player, thus the users can interact with the advisement player through the touch screen, and market competitiveness of such advisement player is enhanced.

Figure 1:
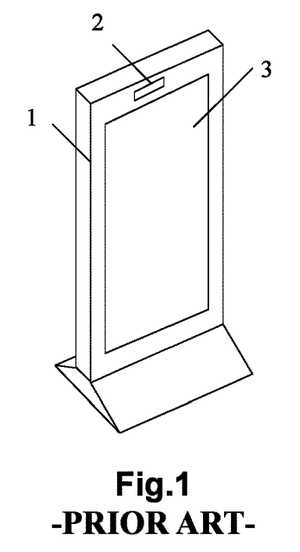
FIG. 1 is a schematic structural diagram of an advisement displayer in a related technology.

In a related technology, most of the touch screens are capacitive or resistive touch screens, which are costly. Since the advisement player is often of larger size, the cost of the advisement player is increased significantly if such touch screen is applied to the advisement player. In order to reduce the cost of the advisement player, as shown in FIG. 1, in a related technology, an infrared camera 2 is disposed above a display screen 3 of an advisement player 1, a human-body action is identified through the infrared camera 2, and man-machine interaction is performed; however, since the infrared camera 2 is oriented to the front of the display screen, a distance is needed for identifying an action of a person with this identification manner, while due to limitation of the picture precision of the infrared camera 2, a specific position of a touch object cannot be located, only type of the user gesture can be determined qualitatively; furthermore, common human-machine interaction would be affected when many people are moving in front of the advisement player, thus user experience in touch interaction is reduced.

SUMMARY

It is provided a touch apparatus and an operating method of touch apparatus in the present disclosure, which may reduce the cost of a touch apparatus having a large screen and ensure touch interaction experience.

Following technical solutions are provided according to embodiments of the present disclosure.

In one aspect, a touch apparatus is provided, which includes: a depth camera device; a display screen, disposed within a viewing range of the depth camera device; and a controller, connected to each of the display screen and the depth camera device. The depth camera device is adapted to capture a depth image within the viewing range, and send the depth image to the controller; and the controller is adapted to receive the depth image, calculate based on the depth image and identify a current touch operation, and output an operation interface corresponding to the current touch operation to the display screen.

Furthermore, the touch apparatus also includes: a housing adapted to receive the display screen and the depth camera device, including a first supporting surface and a second supporting surface perpendicular to the first supporting surface. The display screen is fixed on the first supporting surface, the depth camera device is fixed on the second supporting surface, and an angle $\alpha$ between a lens axis of the depth camera device and a plane where the display screen is located is less than 90 degrees.

Furthermore, the controller includes: a first initial setting module, adapted to control the entire display screen to be bright or blank and control the depth camera device to perform image capturing to obtain a red-green-blue (RGB) image; process the RGB image row by row, detect boundaries between bright points and dark points or between dark points and bright points, and determine two-dimensional coordinate values of four vertices of the display screen in the RGB image; and establish a mapping relationship between a screen coordinate system and an image coordinate system; or a second initial setting module, adapted to, in a case that the display screen and a part of the first supporting surface at a periphery of the display screen are not located at a same plane, control the depth camera device to perform image capturing to obtain an initial depth image; process the initial depth image row by row, detect boundaries of the initial depth image between bright points and dark points or between dark points and bright points, and determine two-dimensional coordinate values of four vertices of the display screen in the initial depth image; and establish a mapping relationship between a screen coordinate system and an image coordinate system.

Furthermore, the controller also includes: a processing module, adapted to process a received current frame of depth image row by row and column by column and determine pixel coordinate values of a touch object in the image coordinate system, when the touch apparatus is in operation; and a calculation module, adapted to, determine screen coordinate values of the touch object in the screen coordinate system based on the pixel coordinate values of the touch object in the image coordinate system and the mapping relationship between the screen coordinate system and the image coordinate system, and output a corresponding operation interface to the display screen according to the screen coordinate values of the touch object.

Furthermore, the processing module is adapted to, process the received current frame of depth image row by row and column by column, determine that the touch object is located in front of the display screen in a case that a brightness value of each pixel in an N-th row to an (N+n)-th row is greater than a brightness value of each pixel in an (N−1)-th row by a first threshold and a brightness value of each pixel in an M-th column to an (M+m)-th column is greater than a brightness value of each pixel in an (M−1)-th column by the first threshold, and determine pixel coordinate values of a center of a region enclosed by the N-th row of pixels, the (N+n)-th row of pixels, the M-th column of pixels and the (M+m)-th column of pixels as the pixel coordinate values of the touch object.

Furthermore, the processing module is also adapted to, determine that the display screen is not touched by the touch object, in a case that the brightness value of each pixel in the N-th row to the (N+n)-th row is greater than the brightness value of each pixel in the (N−1)-th row by a second threshold and the brightness value of each pixel in the M-th column to the (M+m)-th column is greater than the brightness value of each pixel in the (M−1)-th column by the second threshold; and determine that the display screen is touched by the touch object, in a case that a difference between the brightness value of each pixel in the N-th row to the (N+n)-th row and the brightness value of each pixel in the (N−1)-th row is less than the second threshold and greater than the first threshold and a difference between the brightness value of each pixel in the M-th column to the (M+m)-th column and the brightness value of each pixel in the (M−1)-th column is less than the second threshold and greater than the first threshold; where the second threshold is greater than the first threshold.

Furthermore, the controller also includes: a clicking action identification module, adapted to identify that the current touch operation is a clicking action on the display screen, in a case that it is determined that the touch object is located in front of the display screen and does not touch the display screen based on a previous frame of depth image and it is determined that the display screen is touched by the touch object based on the current frame of depth image; and the calculation module is adapted to output a corresponding operation interface to the display screen according to a screen coordinate values corresponding to the pixel coordinate values of the touch object in the current frame of depth image and the clicking action identified by the clicking action identification module.

Furthermore, the controller also includes: a movement track identification module, adapted to compare screen coordinate values corresponding to pixel coordinate values of the touch object in a previous frame of depth image with screen coordinate values corresponding to pixel coordinate values of the touch object in the current frame of depth image, and determine a movement track of the touch object according to a change track of the screen coordinate values; and the calculation module is further adapted to output an operation interface to the display screen according to the movement track of the touch object identified by the movement track identification module.

It is further provided operating method of the touch apparatus described above according to some embodiments of the present disclosure, the operating method includes: capturing, by a depth camera device, a depth image within a viewing range of the depth camera device and sending, by the depth camera device, the depth image to a controller; and calculating based on the received depth image and identifying a current touch operation, by the controller; and outputting an operation interface corresponding to the current touch operation to the display screen by the controller.

Furthermore, before the step of capturing, by the depth camera device, the depth image within the viewing range, the operating method further includes: controlling the entire display screen to be bright or blank and controlling the depth camera device to perform image capturing to obtain a red-green-blue (RGB) image; processing the received RGB image row by row using the controller, detecting boundaries between bright points and dark points or between dark points and bright points, and determining two-dimensional coordinate values of four vertices of the display screen in the RGB image; and establishing a mapping relationship between a screen coordinate system and an image coordinate system; or in a case that the display screen and a part of the first supporting surface located at the periphery of the display screen are not located at a same plane, controlling the depth camera device to perform image capturing to obtain an initial depth image; processing the initial depth image row by row, detecting boundaries of the initial depth image between bright points and dark points or between dark points and bright points, and determining two-dimensional coordinate values of four vertices of the display screen in the initial depth image; and establishing a mapping relationship between a screen coordinate system and an image coordinate system.

Furthermore, the step of calculating based on the received depth image and identifying the current touch operation, by the controller; and outputting the operation interface corresponding to the current touch operation to the display screen by the controller includes: processing a current frame of depth image row by row and column by column by the controller and determining pixel coordinate values of a touch object in the image coordinate system, when the touch apparatus is in operation; and determining screen coordinate values of the touch object in the screen coordinate system based on the pixel coordinate values of the touch object in the image coordinate system and the mapping relationship between the screen coordinate system and the image coordinate system; and outputting a corresponding operation interface to the display screen according to the screen coordinate values of the touch object.

Furthermore, the step of determining the pixel coordinate values of the touch object in the image coordinate system includes: processing the received current frame of depth image row by row and column by column; determining that the touch object is located in front of the display screen in a case that a brightness value of each pixel in an N-th row to an (N+n)-th row is greater than a brightness value of each pixel an (N−1)-th row by a first threshold and a brightness value of each pixel in an M-th column to an (M+m)-th column is greater than a brightness of each pixel in an (M−1)-th column by the first threshold; and determining pixel coordinate values of a center of a region enclosed by the N-th row of pixels, the (N+n)-th row of pixels, the M-th column of pixels and the (M+m)-th column of pixels as the pixel coordinate values of the touch object.

Furthermore, the operating method also includes: determining that the display screen is not touched by the touch object, in a case that the brightness value of each pixel in the N-th row to the (N+n)-th row is greater than the brightness value of each pixel in the (N−1)-th row by a second threshold and the brightness value of each pixel in the M-th column to the (M+m)-th column is greater than the brightness value of each pixel in the (M−1)-th column by the second threshold; and determining that the display screen is touched by the touch object, in a case that a difference between the brightness value of each pixel in the N-th row to the (N+n)-th row and the brightness value of each pixel in the (N−1)-th row is less than the second threshold and greater than the first threshold and a difference between the brightness value of each pixel in the M-th column to the (M+m)-th column and the brightness value of each pixel in the (M−1)-th column is less than the second threshold and greater than the first threshold; where the second threshold is greater than the first threshold.

Furthermore, the step of calculating based on the received depth image and identifying the current touch operation, by the controller includes: identifying that the current touch operation is a clicking action on the display screen, in a case that it is determined that the touch object is located in front of the display screen and does not touch the display screen based on a previous frame of image and it is determined that the display screen is touched by the touch object based on the current frame of depth image. The step of outputting the operation interface corresponding to the current touch operation to the display screen includes: outputting an operation interface to the display screen according to the screen coordinate values corresponding to the pixel coordinate values of the touch object in the current frame depth image and the identified clicking action.

Furthermore, the step of calculating based on the received depth image and identifying the current touch operation, by the controller includes: comparing screen coordinate values corresponding to pixel coordinate values of the touch object in a previous frame of depth image with screen coordinate values corresponding to pixel coordinate values of the touch object in the current frame of depth image, and determining a movement track of the touch object according to a change track of the screen coordinate values. The step of outputting the operation interface corresponding to the current touch operation to the display screen includes: outputting an operation interface to the display screen according to the determined movement track of the touch object.

In above solutions, a depth image is captured by a depth camera device, a touch operation is determined through calculation based on the depth image, and the cost of a touch apparatus having a large screen is reduced due to a relatively low price of the depth camera device. A specific position of a touch object can be determined using the depth camera device, not only a touch detection can be achieved, but also a suspending operation can be identified. The identification of the touch operation is not affected even when many people are moving in front of the touch apparatus, thereby ensuring user experience of touch interaction.

BRIEF DESCRIPTION OF THE DRAWINGS

| Reference numerals: | | |
|---|---|---|
| 1: advisement displayer | 2: infrared camera | 3: display screen |
| 4: depth camera device | 5: housing | |

DETAILED DESCRIPTION OF THE EMBODIMENTS

The present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain other embodiments, which also fall within the scope of the present disclosure.

It is provided a touch apparatus and an operating method of the touch apparatus according to embodiments of the present disclosure, such that cost of a touch apparatus having a large screen can be reduced while touch interaction experience is ensured.

Figure 2:
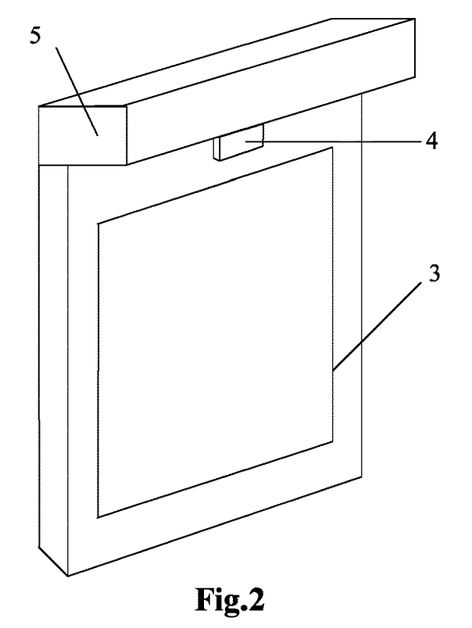
FIG. 2 to FIG. 4 are schematic structural diagrams of a touch apparatus according to some embodiments of the present disclosure.

A touch apparatus is provided according to some embodiments of the present disclosure, as shown in FIG. 2, the touch apparatus includes: a depth camera device 4; a display screen 3 disposed within a viewing range of the depth camera device 4; and a controller (not shown in FIG. 2) connected to the display screen 3 and the depth camera device 4. The depth camera device 4 is adapted to capture a depth image within the viewing range, and send the depth image to the controller. The controller is adapted to receive the depth image, calculate based on the depth image and identify a current touch operation, and output an operation interface corresponding to the current touch operation to the display screen 3.

In the embodiments, a depth image is captured by a depth camera device and a touch operation is determined through calculation based on the depth image. The cost of a touch apparatus having a large screen is reduced due to a relatively low price of the depth camera device. A specific position of a touch object can be located using the depth camera device, not only a touch detection can be performed, but also a suspending operation can be identified. The identification of the touch operation is not affected even when many people are moving in front of the touch apparatus, thereby ensuring user experience of touch interaction.

Figure 4:
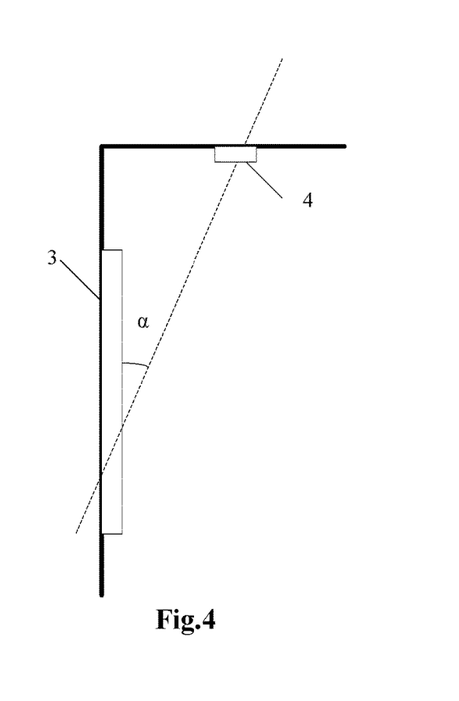
Figure 5:
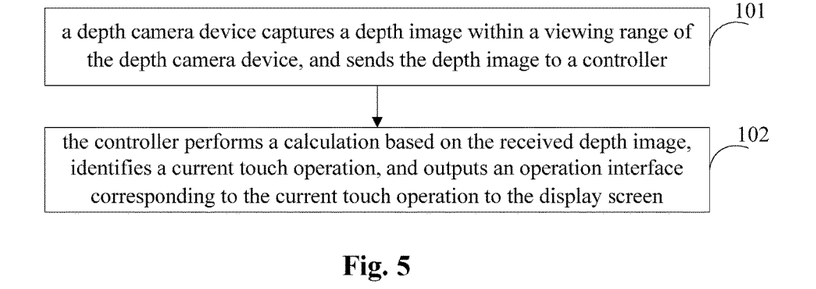
FIG. 5 is a schematic flow chart of an operating method of a touch apparatus according to some embodiments of the present disclosure.

Furthermore, as shown in FIG. 2, the touch apparatus includes: a housing 5 adapted to receive the display screen 3 and the depth camera device 4. The housing 5 includes a first supporting surface and a second supporting surface perpendicular to the first supporting surface. The display screen 3 is fixed on the first supporting surface, the depth camera device 4 is fixed on the second supporting surface, and, as shown in FIG. 4, an angle α between a lens axis of the depth camera device 4 and a plane where the display screen 3 is located is less than 90 degrees.

Figure 3:
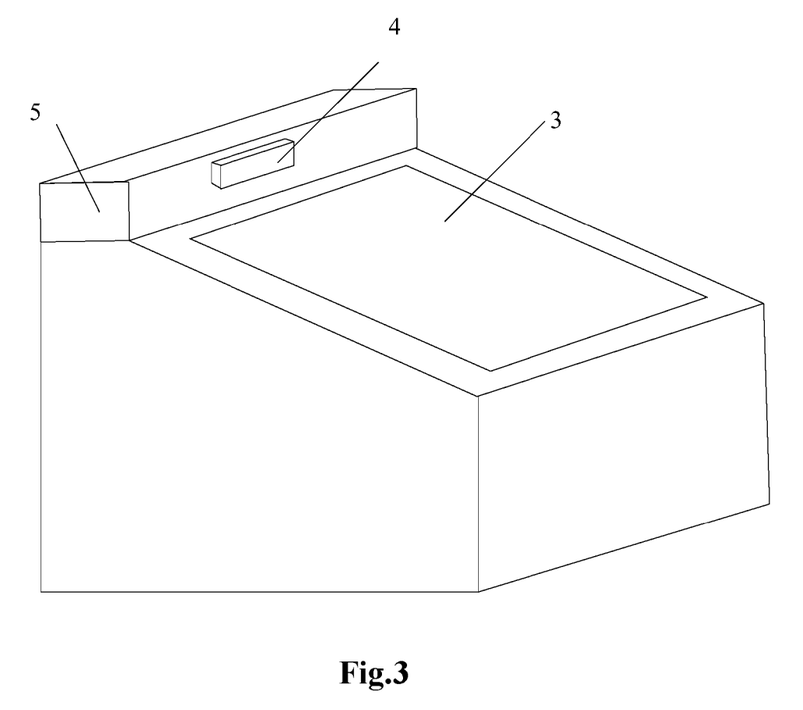

Alternatively, the touch apparatus may have a structure shown in FIG. 3, as long as an angle α between a lens axis of the depth camera device 4 and a plane where the display screen 3 is located is less than 90 degrees and the display screen 3 is located within the viewing range of the depth camera device 4.

Furthermore, the controller includes a first initial setting module and a second initial setting module for initially setting the touch apparatus. Specifically, the first initial setting module is adapted to, control the entire display screen to be bright or blank and control the depth camera device to perform image capturing to obtain a red-green-blue (RGB) image; process the received RGB image row by row, detect boundaries between bright points and dark points or between dark points and bright points, and determine two-dimensional coordinate values of four vertices of the display screen in the RGB image; and establish a mapping relationship between a screen coordinate system and an image coordinate system. The two-dimensional coordinate values of the vertices in the RGB image are row and column coordinate values of pixels in the RGB image corresponding to the vertices. The second initial setting module is adapted to, in a case that the display screen and a part of the first supporting surface at a periphery of the display screen are not located at a same plane, control the depth camera device to perform image capturing to obtain an initial depth image; process the initial depth image row by row, detect boundaries of the initial depth image between bright points and dark points or between dark points and bright points, and determine two-dimensional coordinate values of four vertices of the display screen in the initial depth image; and establish a mapping relationship between a screen coordinate system and an image coordinate system. The two-dimensional coordinate values of the vertices in the initial depth image are row and column coordinate values of pixels in the initial depth image corresponding to the vertices. It should be noted that, coordinates of the four vertices of the display screen in the screen coordinate system may be determined in the following way: determining a length and a width of the display screen, and setting appropriate coordinates for the four vertices according to the length and the width of the display screen. Then, the mapping relationship between the screen coordinate system and the image coordinate system can be determined based on the coordinates of the four vertices in the image coordinate system and the coordinates of the four vertices in the screen coordinate system.

Furthermore, the controller includes a processing module and a calculation module.

The processing module is adapted to process a received current frame of depth image row by row and column by column and determine pixel coordinate values of a touch object in the image coordinate system, when the touch apparatus is in operation, where directions of coordinate axes of the image coordinate system refer to a row direction and a column direction of a pixel, and the pixel coordinate values of the touch object refer to a row number and a column number of a pixel in the depth image corresponding to the touch object.

The calculation module is adapted to determine screen coordinate values of the touch object in the screen coordinate system based on the pixel coordinate values of the touch object in the image coordinate system and the mapping relationship between the screen coordinate system and the image coordinate system, and output a corresponding operation interface to the display screen according to the screen coordinate values of the touch object. For example, multiple icons are currently displayed on the display screen, each of the icons corresponds to an application, an application clicked by the touch object can be determined after the controller determines the screen coordinate values of the touch object, and then an operation interface corresponding to the clicked application is outputted to the display screen.

Figure 6:
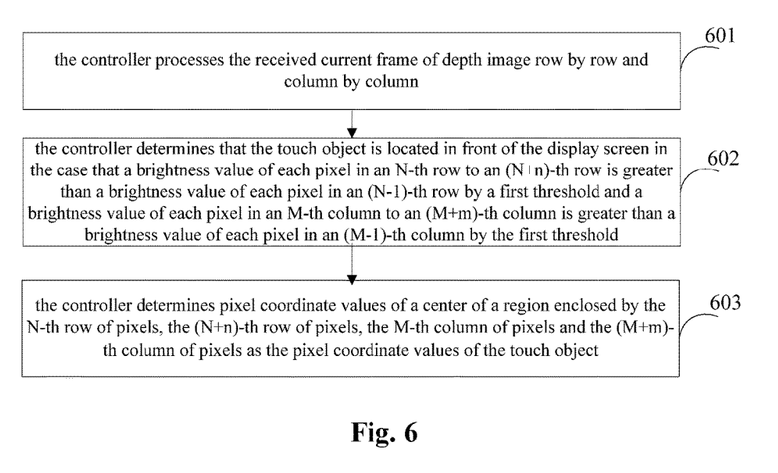
FIG. 6 is another schematic flow chart of an operating method of a touch apparatus according to some embodiments of the present disclosure.

Furthermore, since the touch object is typically bulky, pixel coordinate values of a center of an image of the touch object may serve as the pixel coordinate values of the touch object, such that it is ensured that the pixel coordinate values of the touch object are determined accurately. Specifically, as shown in FIG. 6, the processing module is specifically adapted to process the received current frame of depth image row by row and column by column in step 601, determine that the touch object is located in front of the display screen in a case that a brightness value of each pixel in an N-th row to an (N+n)-th row is greater than a brightness value of each pixel in an (N−1)-th row by a first threshold and a brightness value of each pixel in an M-th column to an (M+m)-th column is greater than a brightness value of each pixel in an (M−1)-th column by the first threshold in step 602, and determine pixel coordinate values of a center of a region enclosed by the N-th row of pixels, the (N+n)-th row of pixels, the M-th column of pixels and the (M+m)-th column of pixels as the pixel coordinate values of the touch object in step 603.

Figure 7:
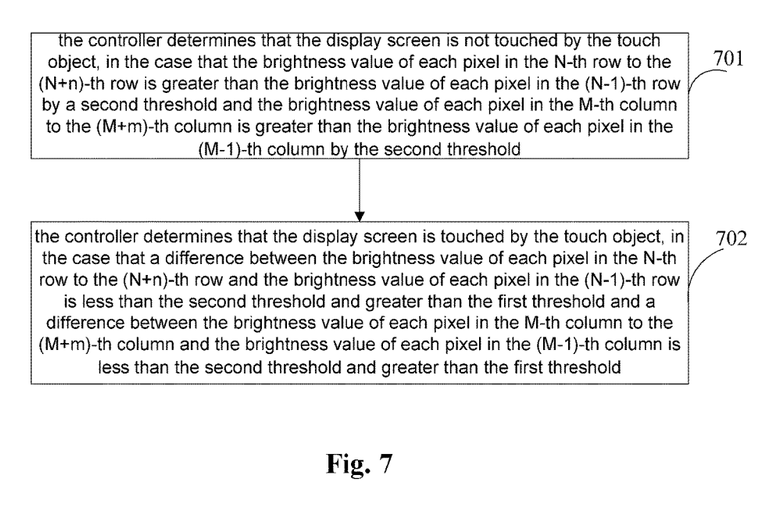
FIG. 7 is still another schematic flow chart of an operating method of a touch apparatus according to some embodiments of the present disclosure.

Furthermore, whether or not the display screen is touched by the touch object may be determined based on the depth image captured by the depth camera device. Specifically, as shown in FIG. 7, the processing module is adapted to determine that the display screen is not touched by the touch object, in a case that a brightness value of each pixel in the N-th row to the (N+n)-th row is greater than a brightness of each pixel in the (N−1)-th row by a second threshold and a brightness value of each pixel in the M-th column to the (M+m)-th column is greater than a brightness value of each pixel in the (M−1)-th column by the second threshold in step 701; and determine that the display screen is touched by the touch object, in a case that a difference between a brightness value of each pixel in the N-th row to the (N+n)-th row and a brightness value of each pixel in the (N−1)-th row is less than the second threshold and greater than the first threshold and a difference between a brightness value of each pixel in the M-th column to the (M+m)-th column and a brightness value of each pixel in the (M−1)-th column is less than the second threshold and greater than the first threshold; where the second threshold is greater than the first threshold in step 702.

Furthermore, whether or not the display screen is clicked by the touch object may be identified based on the depth image captured by the depth camera device. The controller also includes: a clicking action identification module, adapted to identify that a current touch operation is a clicking action on the display screen, in a case that it is determined that the touch object is located in front of the display screen and does not touch the display screen based on a previous frame of depth image and it is determined that the display screen is touched by the touch object based on a current frame of depth image. The calculation module is specifically adapted to output a corresponding operation interface to the display screen according to the screen coordinate values corresponding to the pixel coordinate values of the touch object in the current frame of depth image and the clicking action identified by the clicking action identification module.

Furthermore, a movement track of the touch object may be identified based on the depth image captured by the depth camera device. The controller also includes: a movement track identification module, adapted to compare screen coordinate values corresponding to pixel coordinate values of the touch object in a previous frame of depth image with screen coordinate values corresponding to pixel coordinate values of the touch object in a current frame of depth image, and determine a movement track of the touch object according to a change track of the screen coordinate values. The calculation module is further adapted to output a corresponding operation interface to the display screen according to the movement track of the touch object identified by the movement track identification module.

It is further provided, according to some embodiments of the present disclosure, an operating method of the touch apparatus described above. The operating method includes following step 101 and step 102.

In step 101, a depth camera device captures a depth image within a viewing range of the depth camera device, and sends the depth image to a controller.

In step 102, the controller performs a calculation based on the received depth image, identifies a current touch operation, and outputs an operation interface corresponding to the current touch operation to the display screen.

In the embodiments, a depth image is captured by a depth camera device and a touch operation is determined through calculation based on the depth image. The cost of a touch apparatus having a large screen is reduced due to a relatively low price of the depth camera device. A specific position of a touch object can be located using the depth camera device, not only a touch detection can be performed, but also a suspending operation can be identified. The identification of the touch operation is not affected even when many people are moving in front of the touch apparatus, thereby ensuring user experience of touch interaction.

Furthermore, the touch apparatus needs to be initially set. Accordingly, before capturing the depth image within the viewing range by the depth camera device, the method includes:

controlling the entire display screen to be bright or blank and controlling the depth camera device to perform image capturing to obtain a red-green-blue (RGB) image; processing the received RGB image row by row using the controller, detecting boundaries between bright points and dark points or between dark points and bright points, and determining two-dimensional coordinate values of four vertices of the display screen in the RGB image; and establishing a mapping relationship between a screen coordinate system and an image coordinate system; or in a case that the display screen and a part of the first supporting surface located at the periphery of the display screen are not located at a same plane, controlling the depth camera device to perform image capturing to obtain an initial depth image; processing the initial depth image row by row, detecting boundaries of the initial depth image between bright points and dark points or between dark points and bright points, and determining two-dimensional coordinate values of four vertices of the display screen in the initial depth image; and establishing a mapping relationship between a screen coordinate system and an image coordinate system.

Subsequently, when the touch apparatus is in operation, screen coordinate values of the touch object in the screen coordinate system can be determined based on the mapping relationship between the screen coordinate system and the image coordinate system and the pixel coordinate values of the touch object in the depth image.

Furthermore, the step of performing the calculation based on the received depth image, identifying the current touch operation, and outputting the operation interface corresponding to the current touch operation to the display screen, by the controller includes:

processing a current frame of depth image row by row and column by column by the controller and determining pixel coordinate values of a touch object in the image coordinate system, when the touch apparatus is in operation;

determining screen coordinate values of the touch object in the screen coordinate system based on the pixel coordinate values of the touch object in the image coordinate system and the mapping relationship between the screen coordinate system and the image coordinate system, and outputting a corresponding operation interface to the display screen according to the screen coordinate values of the touch object.

For example, multiple icons are currently displayed on the display screen, each of the icons corresponds to an application, an application clicked by the touch object can be determined after the controller determines the screen coordinate values of the touch object, and then an operation interface corresponding to the clicked application is outputted to the display screen.

Furthermore, since the touch object is typically bulky, pixel coordinate values of a center of an image of the touch object may serve as the pixel coordinate values of the touch object, such that it is ensured that the pixel coordinate values of the touch object are determined accurately. The step of determining the pixel coordinate values of the touch object in the image coordinate system includes: processing the received current frame of depth image row by row and column by column, determining that the touch object is located in front of the display screen in a case that a brightness value of each pixel in an N-th row to an (N+n)-th row is greater than a brightness value of each pixel in an (N−1)-th row by a first threshold and a brightness value of each pixel in an M-th column to an (M+m)-th column is greater than a brightness value of each pixel in an (M−1)-th column by the first threshold, and determining pixel coordinate values of a center of a region enclosed by the N-th row of pixels, the (N+n)-th row of pixels, the M-th column of pixels and the (M+m)-th column of pixels as the pixel coordinate values of the touch object.

Furthermore, whether or not the display screen is touched by the touch object may be determined based on the depth image captured by the depth camera device. The operating method also includes:

determining that the display screen is not touched by the touch object, in a case that a brightness value of each pixel in the N-th row to the (N+n)-th row is greater than a brightness value of each pixel in the (N−1)-th row by a second threshold and a brightness value of each pixel in the M-th column to the (M+m)-th column is greater than a brightness value of each pixel in the (M−1)-th column by the second threshold; and determining that the display screen is touched by the touch object, in a case that a difference between a brightness value of each pixel in the N-th row to the (N+n)-th row and a brightness value of each pixel in the (N−1)-th row is less than the second threshold and greater than the first threshold and a difference between a brightness value of each pixel in the M-th column to the (M+m)-th column and a brightness value of each pixel in the (M−1)-th column is less than the second threshold and greater than the first threshold; where the second threshold is greater than the first threshold.

Furthermore, whether or not the display screen is clicked by the touch object may be identified based on the depth image captured by the depth camera device. The step of performing the calculation based on the received depth image and identifying the touch operation, by the controller includes: identifying that a current touch operation is a clicking action on the display screen, in a case that it is determined that the touch object is located in front of the display screen and does not touch the display screen based on a previous frame of image and it is determined that the display screen is touched by the touch object based on a current frame of depth image. The step of outputting the operation interface corresponding to the current touch operation to the display screen includes: outputting an operation interface to the display screen according to the screen coordinate values corresponding to the pixel coordinate values of the touch object in the current frame of depth image and the identified clicking action.

Furthermore, a movement track of the touch object may be identified based on the depth image captured by the depth camera device. The step of performing the calculation based on the received depth image and identifying the current touch operation, by the controller includes: comparing screen coordinate values corresponding to pixel coordinate values of the touch object in a previous frame of depth image with screen coordinate values corresponding to pixel coordinate values of the touch object in a current frame of depth image, and determining a movement track of the touch object according to a change track of the screen coordinate values. The step of outputting the operation interface corresponding to the current touch operation to the display screen includes: outputting an operation interface to the display screen according to the determined movement track of the touch object.

A touch apparatus and an operating method of the touch apparatus provided in the present disclosure are to be further described below.

It is provided a touch apparatus according to some embodiments of the present disclosure. The touch apparatus includes: a depth camera device, a display screen disposed within a viewing range of the depth camera device, and a controller connected to the display screen and the depth camera device. Where the depth camera device is adapted to capture a depth image within the viewing range and send the depth image to the controller. The controller is adapted to receive the depth image, perform a calculation based on the depth image and identify a current touch operation, and output an operation interface corresponding to the current touch operation to the display screen.

The depth camera device may include more than one depth camera capable of capturing an image based on binocular disparity or in a Time-of-flight (TOF) manner. A 3D imaging based on the TOF manner is performed as follows: a light pulse is sent continuously to an object and light returned form the object is received by a sensor, a distance from the object is obtained by detecting flight (round-trip) time of the light pulse, and then depth information of an entire image is obtained. The cost of a touch apparatus having a large screen is reduced due to a relatively low price of the depth camera device. A specific position of a touch object can be located using the depth camera device, not only a touch detection can be performed, but also a suspending operation can be identified. The identification of the touch operation is not affected even when many people are moving in front of the touch apparatus, thereby ensuring user experience of touch interaction.

As shown in FIG. 2 to FIG. 4, a display screen 3 and a depth camera device 4 are disposed on a housing 5 of the touch apparatus. The depth camera device 4 is located above the display screen 3 and an angle α between a lens axis of the depth camera device 4 and a plane where the display screen 3 is located is less than 90 degrees, such that it is ensured that the display screen 3 is located within the viewing range of the depth camera device 4. The controller may be located on a mobile device such as a computer, and may alternatively be a separate device having functions such as calculating, storing and controlling. The depth camera device 4 may be connected to the controller via a data line such as a USB and may send a captured depth image to the controller via the data line. The controller performs calculation on the received depth image, determines a current touch operation, performs a function corresponding to the identified current touch operation, and outputs a corresponding operation interface to the display screen.

Firstly, it is necessary to establish a mapping relationship between a screen coordinate system of the display screen and an image coordinate system of the image captured by the depth camera device 4. Since the display screen and the housing are both within the viewing range of the depth camera device, it is required to identify a position, a length and a width of the display screen in the depth image captured by the depth camera device, which can be implemented through following two ways. However, the position, the length and the width are not sizes in an actual physical space, but are pixels included in an area occupied by the display screen, a number of the pixels in a length direction of the display screen and a number of pixels in a width direction of the display screen, in a specific resolution of the depth image.

A first way is given as follows. Regarding a binocular depth camera or a depth camera device having an RGB camera, e.g., a Kinect, virtual two-dimension values of four vertexes A, B, C and D of the display screen can be determined using an RGB image. Specifically, the entire display screen is lighted, and a brightness value of the display screen is greater than a brightness value of the housing around the display screen. The controller processes an RGB image captured by the depth camera device row by row, and detects boundary points between preceding dark points and following bright points. For example, when an (x_left)-th pixel in a y-th column is scanned, a brightness value of the (x_left)-th pixel is greater than a brightness value of each preceding pixel in the y-th column, and brightness values of k consecutive pixels following the point of the (x_left)-th pixel are substantially equivalent, for example, a difference between the brightness values of these k pixels is not greater than 5%; here, the point (x_left, y) is considered as pixel coordinates of a vertex on a left side of the display screen in the RGB image, and it is further determined that this point is pixel coordinates of a vertex A at a top left corner of the display screen in the RGB image if this point is the first detected point satisfying the above conditions. Similarly, if a brightness value of an (x_right)-th pixel in the y-th column is greater than brightness values of preceding pixels in the y-th column and brightness values of k consecutive pixels following the point of the (x_right)-th pixel are substantially equivalent, the point (x_right, y) is considered as pixel coordinates of a vertex on a right side of the display screen in the RGB image, and it is further determined that this point is pixel coordinates of a vertex B at a top right corner of the display screen in the RGB image if this point is the first detected point satisfying the above conditions. Two-dimension coordinate values of each of a vertex C at a left bottom corner of the display screen and a vertex D at a right bottom corner of the display screen in the RGB image can be easily detected with similar ways. Such detection way is simple and rapid, when the controller is actuated, the entire display screen is lighted, and the depth camera device is driven to obtain one frame of RGB image, then the pixel coordinates of four vertexes of the display screen can be identified. The whole processing time is approximately equal to time required by the depth camera device for sampling one frame of image. This detection way is independent of relation among respective frames of images, and a process for each frame of image is separate, and there is a separate and complete identification result for each frame of image. It should be noted that, for the depth camera device having the RGB camera, the mapping relationship between the screen coordinate system and an RGB image coordinate system is determined initially, then, the depth camera device merely captures depth images, and the depth image coordinate system is identical to the RGB image coordinate system; hence, the determined mapping relationship between the screen coordinate system and the RGB image coordinate system is identical to a mapping relationship between the screen coordinate system and the depth image coordinate system.

A second way is given as follows. With respect to an uncommon depth camera device having a sole depth image acquisition function, coordinates of the four vertexes A, B, C and D of the display screen can be identified merely based on the depth image. The display screen is disposed on a supporting surface of the housing, a central region of the supporting surface is concave with respect to a peripheral region of the supporting surface and has a size identical to that of the display screen, and the display screen is arranged on the central region of the supporting surface. A plane at which the display screen is located and a plane at which a part of the supporting surface at the periphery of the display screen is located are not coplanar, and specifically, the plane at which the part of the supporting surface at the periphery of the display screen is located is above the plane at which the display screen is located; hence, a distance from the supporting surface to the depth camera device differs from a distance from the display screen to the depth camera device, and accordingly, a brightness of the supporting surface reflected in the depth image differs from a brightness of the display screen reflected in the depth image. Specifically, the display screen is controlled to be blank, and then the controller processes row by row a depth image captured by the depth camera device and detects boundary points between preceding bright points and following dark points. For example, when an (x_left)-th pixel in a y-th column is scanned, a brightness value of the (x_left)-th pixel is less than a brightness value of each preceding pixel in the y-th column, and brightness values of k consecutive pixels following that point of the (x_left)-th pixel are substantially equivalent, for example, a difference between the brightness values of these k pixels is not greater than 5%; here, the point (x_left, y) is considered as pixel coordinates of a vertex on a left side of the display screen in the depth image, and it is further determined that this point is pixel coordinates of a vertex A at a top left corner of the display screen in the depth image if this point is the first detected point satisfying the above conditions. Similarly, if a brightness value of an (x_left)-th pixel in the y-th column is greater than brightness values of preceding pixels in the y-th column and brightness values of k consecutive pixels following that point of the (x_right)-th pixel are substantially equivalent, the point (x_right, y) is considered as pixel coordinates of a vertex on a right side of the display screen in the depth image, and it is further determined that this point is pixel coordinates of a vertex B at a top right corner of the display screen in the depth image if this point is the first detected point satisfying the above conditions. Two-dimension coordinate values of each of a vertex C at a left bottom corner of the display screen and a vertex D at a right bottom corner of the display screen can be easily detected with similar ways. Such detection way is simple and rapid, when the controller is actuated, the entire display screen is blank, and the depth camera device is driven to obtain one frame of depth image, then the pixel coordinates of four vertexes of the display screen can be identified. The whole processing time is approximately equal to time required by the depth camera device for sampling one frame of image. This detection way is independent of relation among respective frames of images, and a process for each frame of image is separately, and there is a separate and complete identification result for each frame of image.

Once the two-dimension values of the four vertexes of the display screen are identified, they may be stored, and a mapping relationship between the screen coordinate system and a depth image coordinate system is established. For the above two ways for identifying the display screen, a two-dimension space is identified, that is, virtual coordinate of each of the four points A, B, C and D in the depth image coordinate system rather than three-dimension coordinates of each of the four points A, B, C and D in a real physical space are identified.

Specifically, when the touch apparatus is in operation, screen coordinate values of the touch object on the display screen may be identified, and an operation interface is outputted to the display screen according to the screen coordinate values of the touch object.

The touch object includes, but is not limited to, a finger. In addition, color of the surface of the touch object is also not limited since the identification is essentially based on depth data in the embodiments. Since a distance from the touch object to the depth camera device is different from a distance from the display screen to the depth camera device, in the captured depth image, a depth value of a region in which the touch object is located is different from depth values of other regions of the display screen. The controller obtains the depth image captured by the depth camera device via a data interface such as a USB, and scans the depth image from top to bottom, row by row and column by column. When a certain row of pixels, such as, an N-th row of pixels is scanned, brightness values are read from left to right. The touch object has its own thickness, a distance from the surface of the touch object to the depth camera device is less than a distance from the display screen to the depth camera device; hence, a brightness value of a corresponding pixel may be changed. If it detected that brightness values of continuous m pixels staring from an M-th column change suddenly and the number m is greater than a certain threshold, it is considered that a touch object may be detected. Then the scanning process is continuously performed up to an (N+n)-th row. From the N-th row to the (N+n)-th row, if in each row there is a number of continuous pixels whose brightness values change and the number is greater than the certain threshold, and the number n of the continuous rows is also greater than a specified range, it is indicated that the touch object is detected. Here, coordinates of a center of a region enclosed by the N-th row of pixels, the (N+n)-th row of pixels, the M-th column of pixels and the (M+m)-th column of pixels serve as pixel coordinate values (Hx, Hy) of the touch object in the two-dimensional image. Then screen coordinate values of the touch object in the display screen are determined based on the pixel coordinate values and the pre-established mapping relationship between the screen coordinate system and the image coordinate system, and a corresponding operation interface is outputted to the display screen according to the screen coordinate values of the touch object. For example, multiple icons are currently displayed on an operation interface of the display screen, each icon corresponds to an application, an application clicked by the touch object can be determined after the controller determines the screen coordinate values of the touch object, and then an operation interface corresponding to the clicked application is outputted to the display screen. The identification of the pixel coordinates of the touch object is performed each time when one frame of depth image is available, and it is unnecessary to store multiple frames of data for processing; thus, the identification in the disclosure is efficient and easily realized.

Furthermore, when the touch apparatus is in operation, a clicking action of the touch object can be identified. Specifically, when it is determined that the touch object is located in front of the display screen and does not touch the display screen based on a previous frame of depth image and it is determined that the display screen is touched by the touch object based on a current frame of depth image, the touch operation is identified as a clicking action on the display screen, and then an operation interface is outputted to the display screen according to screen coordinate values corresponding to pixel coordinate values of the touch object in the current frame of depth image and the identified clicking action. The clicking action includes, but is not limited to, a single clicking and a double clicking.

Specifically, it is determined that the touch object is located in front of the display screen and the display screen is not touched by the touch object, in a case that a brightness value of each pixel in the N-th row to the (N+n)-th row is greater than a brightness of each pixel in the (N−1)-th row by a second threshold and a brightness value of each pixel in the M-th column to the (M+m)-th column is greater than a brightness value of each pixel in the (M−1)-th column by the second threshold; and it is determined that the display screen is touched by the touch object, in a case that a difference between a brightness value of each pixel in the N-th row to the (N+n)-th row and a brightness value of each pixel in the (N−1)-th row is less than the second threshold and greater than a first threshold and a difference between a brightness of each pixel in the M-th column to the (M+m)-th column and a brightness value of each pixel in the (M−1)-th column is less than the second threshold and greater than the first threshold, where the second threshold is greater than the first threshold.

In addition, when the touch apparatus is in operation, a movement track of the touch object may be identified. Specifically, screen coordinate values corresponding to pixel coordinate values of the touch object in the previous frame of depth image are compared with screen coordinate values corresponding to pixel coordinate values of the touch object in the current frame of depth image, and a movement track of the touch object is determined according to a change track of the screen coordinate values; and then a corresponding operation interface may be outputted to the display screen according to the identified movement track of the touch object. For example, a next page of the current operation interface is outputted to the display screen in a case that the identified movement track of the touch object is from left to right; and a previous page of the current operation interface is outputted to the display screen in a case that the identified movement track of the touch object is from right to left.

In related technologies, the touch operation identified by the infrared camera is a remote suspending operation, only a gesture type can be determined qualitatively while precise interaction cannot be achieved, for example, whether or not a certain small button on the display screen is clicked by the touch object cannot be identified. In the embodiments of the present disclosure, the specific position of the touch object can be determined using the depth camera device; thus, precise locating is well achieved. In addition, when using the infrared camera to identify a touch operation, a certain distance is required between human body and the touch apparatus; accordingly, a touch interaction may be affected in an environment with many people. However, in the embodiments of the present disclosure, a touch operation is identified using the depth camera device and identification of the touch operation cannot be affected even when many people are moving in front of the touch apparatus, thereby ensuring user experience of touch interaction. Moreover, compared with a conventional touch identification, multi-point touch identification can be achieved by the depth camera device in the embodiments; and compared with a conventional touch identification, in the embodiment, a touch object identified using the depth camera device is not limited to a finger, but includes other objects without human body current, such as, a stylus, a finger covered by a glove and the like. Besides the touch identification, a close distance suspending touch operation can also be detected in the embodiments; hence, when the touch apparatus is applied to an advisement player, the spread of bacteria among users can be avoided and it is sanitary when performing touching operations.

Some functional components described in this specification are called as modules such that independence of the implementation thereof is more specifically emphasized.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

In each of the method embodiments of the present disclosure, serial number of each step is not intended to define the sequence thereof. For those skilled in the art, a modification about the sequence of each step also falls within protective scope of the present disclosure without any creative work.

Those described above are preferred embodiments of the present disclosure. It should be noted that, for the skilled in the art, improvements and modifications may also be made without departing from the principle of the disclosure. Those improvements and modifications should also be included in the scope of protection of the present disclosure.

What is claimed is:

1. A touch apparatus, comprising:
   a depth camera device;
   a display screen, disposed within a viewing range of the depth camera device;
   a housing that is configured to receive the display screen and the depth camera device; and a controller, connected to each of the display screen and the depth camera device, wherein the display screen and the housing are both within the viewing range of the depth camera device, and a brightness value of the display screen is greater than a brightness value of the housing around the display screen, wherein the housing comprises a first supporting surface and a second supporting surface perpendicular to the first supporting surface; and wherein the display screen is fixed on the first supporting surface, the depth camera device is fixed on the second supporting surface, and an angle $\alpha$ between a lens axis of the depth camera device and a plane where the display screen is located is less than 90 degrees and greater than 0 degrees, wherein the depth camera device is configured to capture a depth image within the viewing range and send the depth image to the controller, wherein the controller is configured to receive the depth image, calculate and identify a current touch operation based on the depth image, and output an operation interface corresponding to the current touch operation to the display screen, wherein the controller is further configured to control the display screen to be entirely bright or entirely blank, wherein the controller is further configured to control the depth camera device to perform image capturing to obtain a red-green-blue (RGB) image, process the RGB image row by row, detect boundaries between bright points and dark points or between dark points and bright points, determine two-dimensional coordinate values of four vertices of the display screen in the RGB image, and establish a mapping relationship between a screen coordinate system and an image coordinate system, wherein the controller is further configured to:

control the depth camera device to perform image capturing to obtain an initial depth image in response to the display screen and a part of the first supporting surface at a periphery of the display screen being not located at a same plane;

process the initial depth image row by row, detect boundaries between bright points and dark points or between dark points and bright points;

determine the two-dimensional coordinate values of the four vertices of the display screen in the initial depth image;

establish the mapping relationship between the screen coordinate system and the image coordinate system;

process a received current frame of depth image row by row and column by column and determine pixel coordinate values of a touch object in the image coordinate system in response to the touch apparatus being in operation;

determine screen coordinate values of the touch object in the screen coordinate system based on the pixel coordinate values of the touch object in the image coordinate system and the mapping relationship between the screen coordinate system and the image coordinate system, and output a corresponding operation interface to the display screen according to the screen coordinate values of the touch object;

process the received current frame of depth image row by row and column by column;

determine that the touch object is located in front of the display screen in response to a brightness value of each pixel in an N-th row of pixels to an (N+n)-th row of pixels being greater than a brightness value of each pixel in an (N−1)-th row of pixels by a first threshold and a brightness value of each pixel in an M-th column of pixels to an (M+m)-th column of pixels is greater than a brightness value of each pixel in an (M−1)-th column of pixels by the first threshold;

determine pixel coordinate values of a center of a region enclosed by the N-th row of pixels, the (N+n)-th row of pixels, the M-th column of pixels and the (M+m)-th column of pixels as the pixel coordinate values of the touch object, where N represents a row number of pixels, and M represents a column number of pixels;

determine that the display screen is not touched by the touch object in response to the brightness value of each pixel in the N-th row of pixels to the (N+n)-th row of pixels being greater than the brightness value of each pixel in the (N−1)-th row of pixels by a second threshold and the brightness value of each pixel in the M-th column of pixels to the (M+m)-th column of pixels is greater than the brightness value of each pixel in the (M−1)-th column of pixels by the second threshold, and determine that the display screen is touched by the touch object in response to a difference between the brightness value of each pixel in the N-th row of pixels to the (N+n)-th row of pixels and the brightness value of each pixel in the (N−1)-th row of pixels being less than the second threshold and greater than the first threshold and a difference between the brightness value of each pixel in the M-th column of pixels to the (M+m)-th column of pixels and the brightness value of each pixel in the (M−1)-th column of pixels is less than the second threshold and greater than the first threshold, wherein the second threshold is greater than the first threshold.

2. The touch apparatus according to claim 1, wherein the controller is further configured to:

identify that the current touch operation is a clicking action on the display screen in response to determining that the touch object is located in front of the display screen and does not touch the display screen based on a previous frame of depth image and determining that the display screen is touched by the touch object based on the received current frame of depth image; and output a corresponding operation interface to the display screen according to a screen coordinate values corresponding to the pixel coordinate values of the touch object in the received current frame of depth image and the clicking action identified by the controller.

3. The touch apparatus according to claim 1, wherein the controller is further configured to:

compare screen coordinate values corresponding to pixel coordinate values of the touch object in a previous frame of depth image with screen coordinate values corresponding to pixel coordinate values of the touch object in the received current frame of depth image, and determine a movement track of the touch object according to a change track of the screen coordinate values corresponding to the pixel coordinate values of the touch object in the previous frame and the received current frame of depth image; and output an operation interface to the display screen according to the movement track of the touch object identified by the controller.

4. An operating method of a touch apparatus, wherein the touch apparatus comprises:

a depth camera device, a display screen disposed within a viewing range of the depth camera device, a housing configured to receive the display screen and the depth camera device, and a controller connected to each of the display screen and the depth camera device;

wherein the display screen and the housing are both within the viewing range of the depth camera device, and a brightness value of the display screen is greater than a brightness value of the housing around the display screen, the operating method comprising:

controlling the display screen to be entirely bright or entirely blank and controlling the depth camera device to capture a red-green-blue (RGB) image;

processing the RGB image row by row, detecting boundaries between bright points and dark points or between dark points and bright points;

determining two-dimensional coordinate values of four vertices of the display screen in the RGB image;

establishing a mapping relationship between a screen coordinate system and an image coordinate system;

controlling the depth camera device to perform image capturing to obtain an initial depth image in response to the display screen and a part of a first supporting surface located at a periphery of the display screen being not located at a same plane;

processing the initial depth image row by row, detecting boundaries between bright points and dark points or between dark points and bright points;

determining the two-dimensional coordinate values of the four vertices of the display screen in the initial depth image;

establishing the mapping relationship between the screen coordinate system and the image coordinate system;

capturing, by the depth camera device, a depth image within the viewing range of the depth camera device and sending, by the depth camera device, the depth image to the controller;

calculating and identifying a current touch operation based on the depth image by the controller;

outputting an operation interface corresponding to the current touch operation to the display screen by the controller; wherein the calculating and identifying the current touch operation based on the depth image, by the controller; and outputting the operation interface corresponding to the current touch operation to the display screen by the controller comprises:

processing a current frame of depth image row by row and column by column by the controller and determining pixel coordinate values of a touch object in the image coordinate system in response to the touch apparatus being in operation; and determining screen coordinate values of the touch object in the screen coordinate system based on the pixel coordinate values of the touch object in the image coordinate system and the mapping relationship between the screen coordinate system and the image coordinate system; and outputting a corresponding operation interface to the display screen according to the screen coordinate values of the touch object, wherein the determining the pixel coordinate values of the touch object in the image coordinate system comprises:

processing the current frame of depth image row by row and column by column;

determining that the touch object is located in front of the display screen in response to a brightness value of each pixel in an N-th row of pixels to an (N+n)-th row of pixels being greater than a brightness value of each pixel an (N−1)-th row of pixels by a first threshold and a brightness value of each pixel in an M-th column of pixels to an (M+m)-th column of pixels is greater than a brightness value of each pixel in an (M−1)-th column of pixels by the first threshold; and determining pixel coordinate values of a center of a region enclosed by the N-th row of pixels, the (N+n)-th row of pixels, the M-th column of pixels and the (M+m)-th column of pixels as the pixel coordinate values of the touch object, where N represents a row number of pixels, and M represents a column number of pixels;

determining that the display screen is not touched by the touch object in response to the brightness value of each pixel in the N-th row of pixels to the (N+n)-th row of pixels being greater than the brightness value of each pixel in the (N−1)-th row of pixels by a second threshold and the brightness value of each pixel in the M-th column of pixels to the (M+m)-th column of pixels is greater than the brightness value of each pixel in the (M−1)-th column of pixels by the second threshold; and determining that the display screen is touched by the touch object in response to a difference between the brightness value of each pixel in the N-th row of pixels to the (N+n)-th row of pixels and the brightness value of each pixel in the (N−1)-th row of pixels being less than the second threshold and greater than the first threshold and a difference between the brightness value of each pixel in the M-th column of pixels to the (M+m)-th column of pixels and the brightness value of each pixel in the (M−1)-th column of pixels is less than the second threshold and greater than the first threshold, wherein the second threshold is greater than the first threshold.

5. The operating method according to claim 4, wherein the calculating and identifying the current touch operation based on the depth image, by the controller comprises:

identifying that the current touch operation is a clicking action on the display screen in response to determining that the touch object is located in front of the display screen and does not touch the display screen based on a previous frame of image and determining that the display screen is touched by the touch object based on the current frame of depth image; and wherein the outputting the operation interface corresponding to the current touch operation to the display screen comprises:

outputting the operation interface to the display screen according to the screen coordinate values corresponding to the pixel coordinate values of the touch object in the current frame depth image and the identified clicking action.

6. The operating method according to claim 4, wherein the calculating and identifying the current touch operation based on the depth image, by the controller comprises:

comparing screen coordinate values corresponding to pixel coordinate values of the touch object in a previous frame of depth image with screen coordinate values corresponding to pixel coordinate values of the touch object in the current frame of depth image, and determining a movement track of the touch object according to a change track of the screen coordinate values corresponding to the pixel coordinate values of the touch object in the previous frame and the current frame of depth image; and wherein the outputting the operation interface corresponding to the current touch operation to the display screen comprises:

outputting the operation interface to the display screen according to the determined movement track of the touch object.

\* \* \* \* \*